United States Patent
Yogeeswaran et al.

(10) Patent No.: US 10,230,510 B2
(45) Date of Patent: *Mar. 12, 2019

(54) OPTIMIZATIONS FOR ZERO-FORCING PRECODING

(71) Applicant: Facebook, Inc., Menlo Park, CA (US)

(72) Inventors: Karthik Yogeeswaran, San Francisco, CA (US); Ali Yazdan Panah, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,604

(22) Filed: Oct. 24, 2017

(65) Prior Publication Data

US 2018/0062812 A1    Mar. 1, 2018

Related U.S. Application Data

(63) Continuation of application No. 15/655,673, filed on Jul. 20, 2017, which is a continuation of application
(Continued)

(51) Int. Cl.
*H04Q 7/00*    (2006.01)
*H04L 5/00*    (2006.01)
(Continued)

(52) U.S. Cl.
CPC ......... *H04L 5/0048* (2013.01); *H04B 7/0417* (2013.01); *H04B 7/0452* (2013.01); *H04B 7/0626* (2013.01); *H04B 7/0628* (2013.01)

(58) Field of Classification Search
CPC ... H04L 5/0048; H04B 7/0626; H04B 7/0452; H04B 7/0417; H04B 7/0628
(Continued)

(56) References Cited

U.S. PATENT DOCUMENTS 8,675,784 B1 * 3/2014 Wu ............... H04L 25/03242
375/341
8,923,427 B2   12/2014 Gomadam
(Continued)

OTHER PUBLICATIONS

Non-Final Office Action dated Sep. 22, 2016, for U.S. Appl. No. 14/669,552, of Panah, A. filed Mar. 26, 2015.
(Continued)

*Primary Examiner* — Chuong T Ho
(74) *Attorney, Agent, or Firm* — FisherBroyles, LLP

(57) ABSTRACT

Massive MIMO systems provide impressive spectral efficiencies through beam forming techniques such as Zero-Forcing Precoding (ZFP). Unfortunately, ZFP imposes a considerable computational burden for each additional user. Relationships between the antennas, the users, and the environment must be rapidly, and accurately, reassessed during ZFP on an ongoing basis. Brute force approaches to these reassessments may be unfeasible for certain hardware and design conditions. Accordingly, various of the proposed embodiments implement representational optimizations which reduce the computational burden for each reassessment. Some embodiments employ "dynamic sectorization", whereby the serviced environment is divided into regions and the corresponding representation is modified to reduce the computations of each reassessment. A backplane, antenna separation/directivity and thresholds for environment noise may each be adjusted to reduce the computational burden.

16 Claims, 17 Drawing Sheets

Related U.S. Application Data

No. 14/669,552, filed on Mar. 26, 2015, now Pat. No. 9,794,036.

(51) Int. Cl.
*H04B 7/0452* (2017.01)
*H04B 7/0417* (2017.01)
*H04B 7/06* (2006.01)

(58) Field of Classification Search
USPC .......................... 370/329, 328, 330; 375/267
See application file for complete search history.

(56) References Cited

U.S. PATENT DOCUMENTS

| | | | | |
|---|---|---|---|---|
| 9,609,658 | B2* | 3/2017 | Maaref | H04L 1/004 |
| 9,794,036 | B2* | 10/2017 | Panah | H04L 5/0048 |
| 2009/0285325 | A1* | 11/2009 | Zhou | H04B 7/0854 |
| | | | | 375/267 |
| 2013/0114655 | A1 | 5/2013 | Gomadam et al. | |
| 2015/0036623 | A1* | 2/2015 | Maaref | H04L 1/004 |
| | | | | 370/329 |
| 2016/0080051 | A1* | 3/2016 | Sajadieh | H04B 7/0456 |
| | | | | 375/267 |
| 2016/0135180 | A1 | 5/2016 | Zhang et al. | |
| 2016/0285530 | A1 | 9/2016 | Panah et al. | |
| 2018/0019849 | A1 | 1/2018 | Yogeeswaran et al. | |
| 2018/0062812 | A1* | 3/2018 | Yogeeswaran | H04L 5/0048 |

OTHER PUBLICATIONS

Notice of Allowance dated Mar. 17, 2017 for U.S. Appl. No. 14/669,552 for Panah, A. et al, filed Mar. 26, 2015.
U.S. Appl. No. 14/669,552 by Panah, A. et al., filed Mar. 26, 2015.
U.S. Appl. No. 15/655,673 by Panah, A. et al., filed Jul. 20, 2017.

* cited by examiner $$C = \begin{bmatrix} C_{11} & C_{12} & C_{12} & C_{14} & C_{15} & C_{16} & C_{17} & C_{18} \\ C_{21} & C_{22} & C_{23} & C_{24} & C_{25} & C_{26} & C_{27} & C_{28} \\ C_{31} & C_{32} & C_{32} & C_{34} & C_{35} & C_{36} & C_{37} & C_{38} \\ C_{41} & C_{42} & C_{42} & C_{44} & C_{45} & C_{46} & C_{47} & C_{48} \end{bmatrix} \begin{matrix} \text{User A} \\ \text{User B} \\ \text{User C} \\ \text{User D} \end{matrix}$$

Ant1  Ant2  Ant3  Ant4  Ant5  Ant6  Ant7  Ant8

205

*PRIOR ART*

*FIG. 2*

$$C = \begin{bmatrix} C_{11} & C_{12} & C_{13} & C_{14} & 0 & 0 & 0 & 0 \\ 0 & 0 & 0 & C_{24} & C_{25} & C_{26} & C_{27} & 0 \\ 0 & C_{32} & C_{33} & C_{34} & C_{35} & 0 & 0 & 0 \\ 0 & 0 & 0 & 0 & C_{15} & C_{46} & C_{47} & C_{48} \end{bmatrix} \begin{matrix} \text{User A} \\ \text{User B} \\ \text{User C} \\ \text{User D} \end{matrix}$$

$\quad$ Ant1 Ant2 Ant3 Ant4 Ant5 Ant6 Ant7 Ant8

*FIG. 6*

Table 1: System level simulator performance comparison

|  | baseline | $w = 0.5\lambda$ | $w = 0.4\lambda$ |
|---|---|---|---|
| Number of non-zero elements in C | 2304 | 1152 | 192 |
| Number of non-zero elements in A | 576 | 576 | 164 |
| Calculation speed improvement (%) | 0 | 0 | 48.2 |
| Mean downlink spectral efficiency (bps/Hz) | 78.2 | 78.0 | 70.3 |
| Max achievable downlink spectral efficiency (bps/Hz) | 78.4 | 78.4 | 78.4 |
| Spectral efficiency loss from max (%) | 0.26 | 0.51 | 10.3 |

*FIG. 14*

OPTIMIZATIONS FOR ZERO-FORCING PRECODING

TECHNICAL FIELD

The disclosed embodiments relate to Multi-Input-Multi-Output (MIMO) communications schemes.

BACKGROUND

Multi-user multiple-input multiple-output (MU-MIMO) systems with a large number of base-station antennas may serve as high throughput communications for emerging wireless deployments. By spatially multiplexing signals, the base-station antenna array may serve many separate user terminals using the same time-frequency resource. This spatial resource sharing policy may serve as an alternative to costly spectrum licensing. The policy may also avoid the costly procurement of additional base stations used in conventional cell-shrinking strategies.

While the benefits of spatial multiplexing may be fully realized when the number of base-station antennas is equal to the number of scheduled user terminals, MU-MIMO systems with an excessively large number of antennas, also known as "Massive MIMO" may also provide additional benefits. Massive MIMO can increase the system's capacity while simultaneously improving the radiated energy efficiency via energy-focusing. Massive MIMO systems can also be integrated with inexpensive, low-power components by replacing expensive high-power linear amplifiers with low-power counterparts (e.g., mW rather than W). Massive MIMO can also simplify the multiple-access (MAC) layer by scheduling users on the entire band without the need for feedback. As the number of antennas in a MIMO cell grows larger, uncorrelated noise and small-scale fading may be mostly eliminated and the required transmitted energy-per-bit may be significantly reduced.

Unfortunately, massive MIMO implementations present some very challenging aspects, including, e.g.: antenna design, pilot contamination, intercell interference management, and hardware impairments. Signal processing may resolve some of these complications. Zero-forcing (ZF) beamforming, for example, is a signal processing technique, which has been shown to yield very high spectral efficiencies under favorable conditions. ZF precoding eliminates the interference between the user data streams in the downlink MIMO channel. The MIMO channel matrix includes channel state information (CSI) at the base-station acquired during a pilot transmission phase in the uplink from the user terminals. Once the CSI is acquired, the ZF decoupling operation can be realized via complex matrix inversions on the MIMO channel matrix at the base-station.

Unfortunately, matrix inversion can become computationally expensive for MIMO systems with a very large number of user terminals since the inversion incurs cubic computational complexity in the number of users. Accordingly, there exists a need for improved ZF precoder operations that allow for scalable massive MIMO system design.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 2 is a channel matrix illustrating user-antenna relations as may occur in some embodiments;

FIG. 6 is a channel matrix illustrating the effect of backplane sectorization upon the correlation matrix as may occur in some embodiments;

FIG. 14 is a table illustrating benefits determined via simulation using different configurations of the proposed embodiments;

Figure 1:
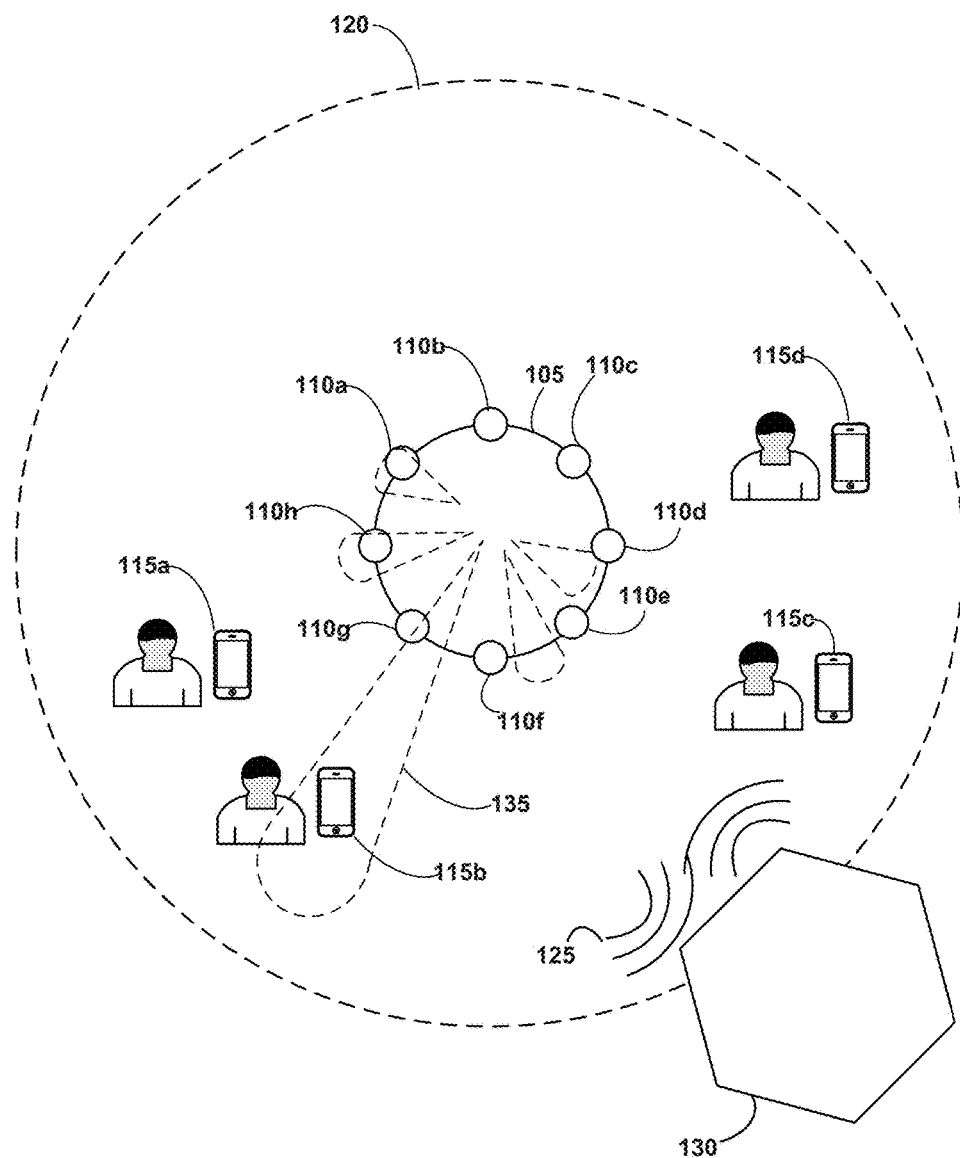
FIG. 1 is a block diagram illustrating an example MIMO coverage topology with several users as may be implemented in some embodiments.

Those skilled in the art will appreciate that the logic illustrated in various of the figures including the flow diagrams discussed herein, may be altered in a variety of ways. For example, the order of the logic may be rearranged, substeps may be performed in parallel, illustrated logic may be omitted, other logic may be included, etc. Those skilled in the art will appreciate that actual data structures used to store information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Massive MIMO systems provide impressive spectral efficiencies through beam forming techniques such as Zero-Forcing Precoding (ZFP). Unfortunately, ZFP imposes a considerable computational burden for each additional user. Relationships between the antennas, the users, and the environment may need to be rapidly, and accurately, reassessed during ZFP on an ongoing basis. Brute force approaches to these reassessments may be unfeasible for certain hardware and design conditions. Accordingly, various of the proposed embodiments implement representational optimizations which reduce the computational burden for each reassessment. Some embodiments employ "dynamic sectorization" whereby the serviced environment is divided into regions and the corresponding representation is modified to reduce the computations of each reassessment. Each of a dynamic backplane, antenna separation/directivity, and thresholds for environment noise may be adjusted to reduce the computational burden.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview

FIG. 1 a block diagram illustrating an example MIMO coverage topology with several users as may be implemented in some embodiments. Though the MIMO system 105 in this example is illustrated with eight antennas 110a-h to facilitate understanding, one will recognize that a real-world Massive MIMO system may have hundreds or thousands of antennas. Neither need the antennas be arranged in a circle as illustrated. The antennas 110a-h may constructively/destructively interfere with one another to provide directional signal 135 that can selectively reach one of user devices 115a-d within a range 120. In this manner, the system 105 may selectively communicate with each of the user devices 115a-d.

FIG. 2 a channel matrix illustrating user-antenna relations as may occur in some embodiments. Particularly, the system 105 may rely upon the environment, such as reflections 125 from an object 130, to distinguish signals sent to/from different user devices 115a-d. To determine the relationships between different user devices and each antenna, the system may periodically transmit a "pilot signal". This signal may be used to calibrate the antennas based upon the responsive character of the user devices. The channel matrix 205, may reflect a complex coefficient $C_{mn}$ reflecting the relation between of the m users and n antennas. For example, the coefficient $C_{24}$ reflects the pilot signal relation between the second user (User B) and the fourth antenna (Ant4). These relations may change as the users and the environment move and so the channel matrix 205 must be periodically recalculated. The number of zeros in the channel matrix 205, i.e., the matrix's "sparsity", can simplify subsequent operations, such as the determination of a precoding matrix.

System Model—Mathematical Model

To formulate the ZF massive MIMO system, consider an example involving a linearly precoded MU-MIMO system with M antennas at the base-station serving K users. Let $s=[s_1, s_2, \ldots, s_K]$ represent the baseband QAM symbols intended for the user terminals and let $F=[f_1, f_2, \ldots, f_K]$ be the M×K precoding matrix where $f_k$ is the beamforming vector allocated to user k by the base-station. The MIMO channel can be modeled by the K×M channel matrix C. The noise at the user devices may be represented by the K length vector n. The received signals at the users in the downlink is of the form:

$$r = CFs + n \qquad (1)$$

The ZF precoding solution is the precoder matrix F such that the MIMO channel is diagonalized: $CF=D_K$, where $D_K$ is a K×K diagonal matrix.

The solution is the Moore-Penrose pseudo-inverse given by:

$$F = C^H(CC^H)^{-1} \qquad (2)$$

where $C^H$ is the conjugate-transpose of the MIMO channel matrix.

System Model—Computational Complexity

Figure 3:
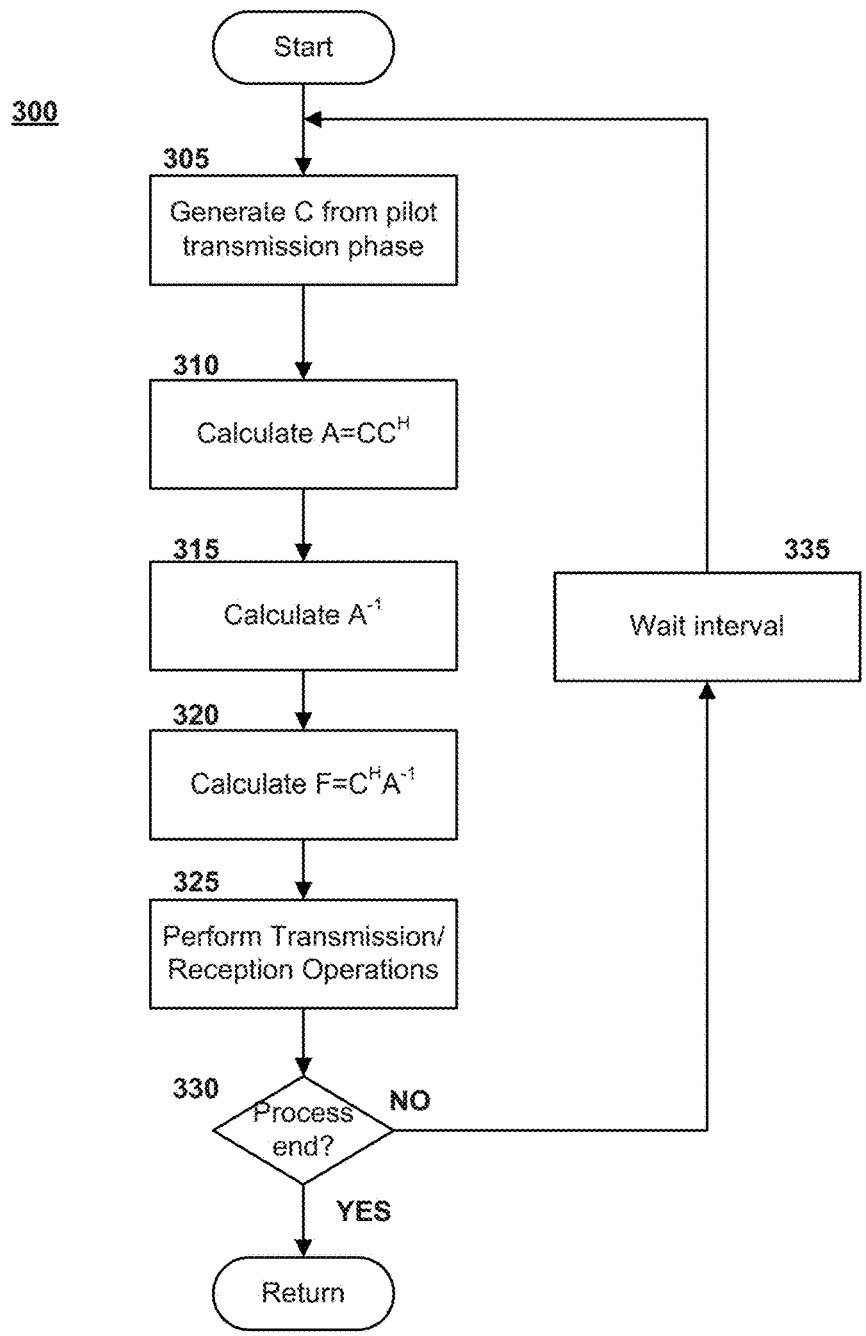
FIG. 3 is a flow diagram illustrating MIMO zero-forcing calculations as may be implemented in some embodiments.

The computational complexity of calculating the ZF precoder can be quantified by the number of FLOPs needed to calculate F in (2), where a "FLOP" is defined herein to be either a complex multiplication or a complex summation. The total FLOP count is referred to herein by $\epsilon$. The computation of (2) can be broken down generally into 3 steps reflected in FIG. 3 (blocks 310, 315, and 320). FIG. 3 is a flow diagram illustrating MIMO zero-forcing calculations as may be implemented in some embodiments. At block 305, the system may generate the channel coefficient matrix C using a pilot transmission signal.

At block 310, the system may calculate the Hermitian correlation matrix A by multiplying C with C's Hermitian conjugate $C^H$. Since $A=A^H$, the strictly lower triangular part of A need not be computed. This includes K main diagonal elements plus $0.5(K^2-K)$ off diagonal elements for a total of $0.5(K^2+K)$ elements. Each element requires an inner vector product of length M costing M multiplications and M−1 summations. Therefore, $0.5(KM(K+1))$ multiplications and $0.5(K(M-1)(K+1))$ summations are needed making up a total amount of $MK^2+MK-0.5K^2-0.5K$ FLOPs.

At block 315, the system may determine the inverse of A. Since A is Hermitian, an effective way to compute the inverse is the Cholesky decomposition. The Cholesky decomposition provides the lower triangular matrix L such that $A=LL^H$. The inverse of A is then given by $A^{-1}=L^{-H}L^{-1}$, where $L^{-1}$ can be efficiently computed using forward-substitution. Adding up all the respective operations yields $0.5K^3+1.5K^2$ multiplications, $0.5K^3-0.5K^2$ summations, and K square-root operations, for a total amount of $K^3+K^2+K$ FLOPs.

Reduced Step 2 (block 315) of the ZF precoder algorithm involves the calculation of the inverse of the Hermitian matrix $A=CC^H$. The ZF precoding algorithm can involve inverting the Hermitian matrix A using Cholesky decomposition by obtaining the Cholesky factor L, where $A=LL^H$. The matrix inversion of the matrix A can however benefit from sparsity since in the algorithmic steps in computing L, operations on zeros can be skipped. Essentially, during the Cholesky factorization, if zeros are represented implicitly rather than explicitly, one can avoid computations that have no effect, as well as save storage. Furthermore, sparsity in the matrix A is generally not sufficient in reducing the computation of the Cholesky factor. Ultimately, the computational cost not only depends on the number of zero elements in A but also the location of the zeros, i.e. the sparsity pattern. In light of these observations, various embodiments seek to determine a generally sparse matrix A from its dense form as well as to provide the best sparse representation of the matrix A suitable for reduced complexity Cholesky decomposition.

At block 320, the system may then determine the precoding matrix F for beamforming by multiplying the Hermitian conjugate $C^H$ with the intermediate matrix A. This matrix multiplication may require $2MK^2-MK$ FLOPs. The total computation required, $\epsilon$, to calculate the ZF precoder in EQN. 2 equals the summation of the computations in blocks 310, 315, and 320 above, i.e.:

$$\epsilon=K^3+(3M+0.5)K^2+0.5K \quad (3)$$

Figure 4:
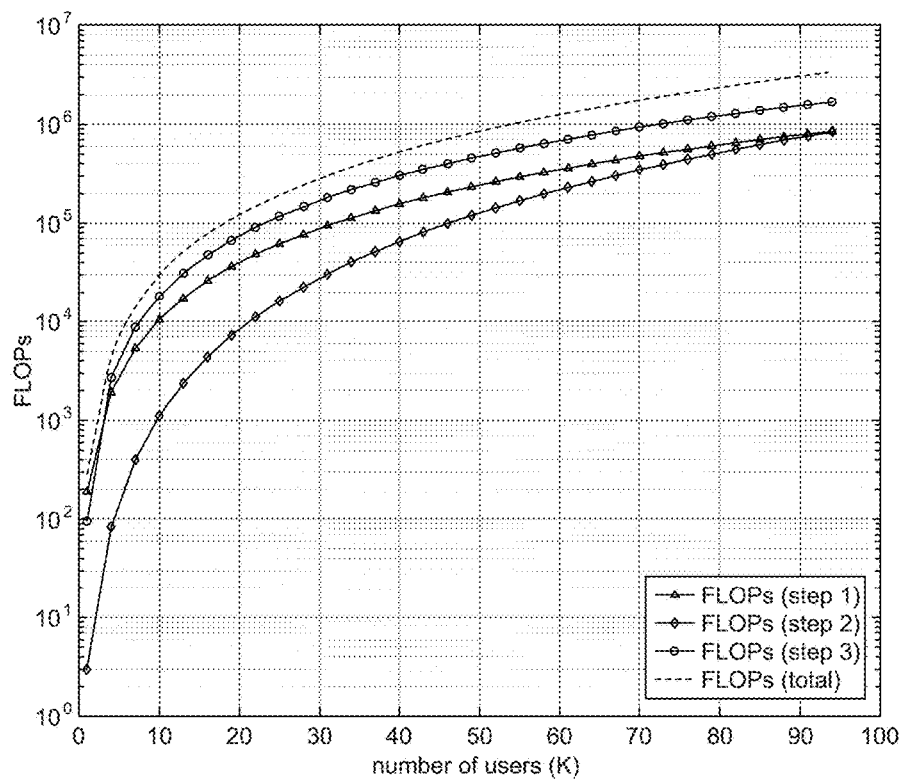
FIG. 4 is a plot of the FLOPs vs number of users simulated for a base-station with 96 antennas as may occur in some embodiments.

Under massive MIMO conditions $$\frac{M}{K}=\beta \gg 1,$$

for a constant $\beta$ (typically 2~10), so that $\epsilon$ is dominated by its second term. The total computation $\epsilon$ is generally therefore cubic-ordered in the number of users, i.e.: $\epsilon \sim O(K^3)$. FIG. 4 is a plot of the FLOPs vs number of users simulated for a base-station with 96 antennas (i.e., M=96) as may occur in some embodiments. In this configuration, the number of FLOPs spent by the matrix multiplication steps is higher than the FLOPs needed for the matrix inverse operations at block 315, especially for K<<M.

The matrix F may then be used to perform transmission/reception operations with each of the users at block 325. If more iterations are to be performed (e.g., if the matrix F is to be adjusted every 300 ms to account for changes) then at block 330 the system may repeat the process after a suitable interval at block 335.

Backplane Sectorization

Figure 5:
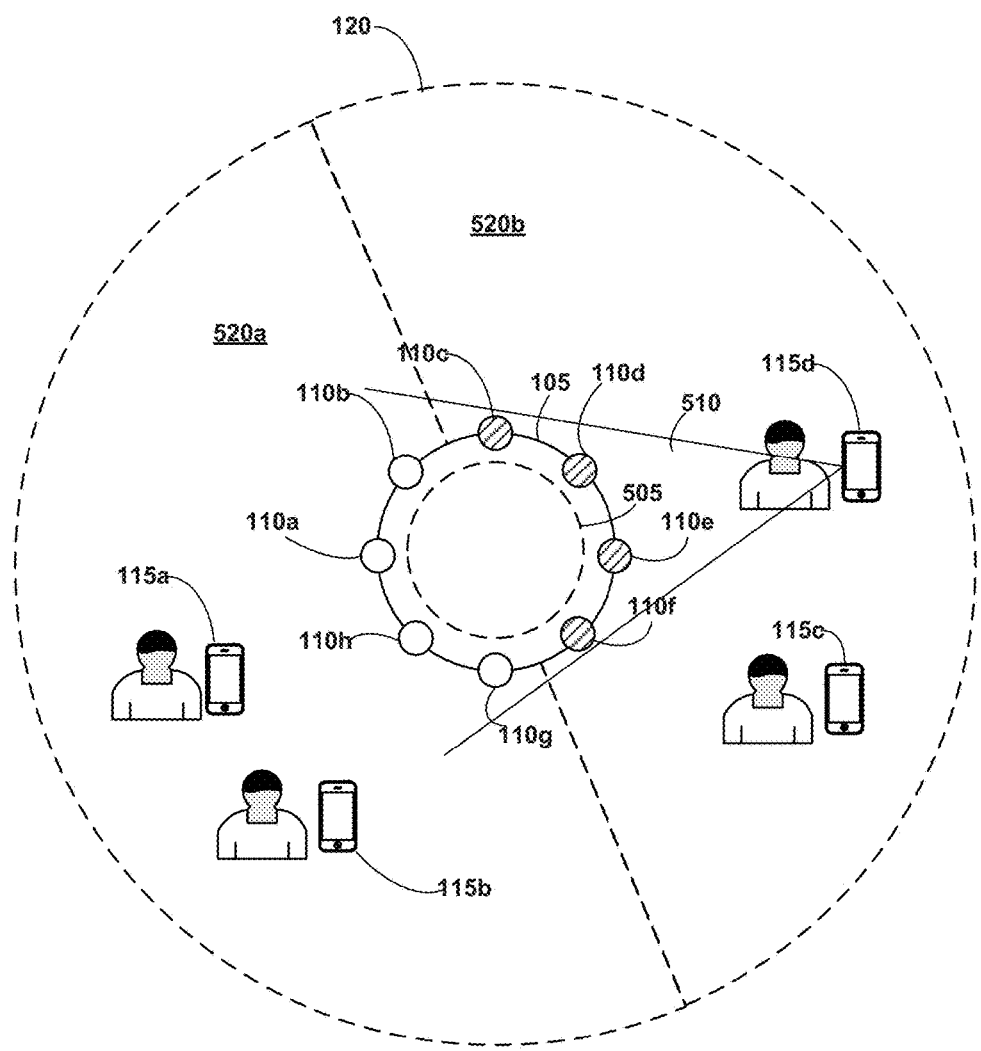
FIG. 5 is a block diagram illustrating the effect of backplane sectorization upon user visibility as may be implemented in some embodiments.

Properly located zeros in the matrix 205 can make calculation of the beamforming matrix F much more efficient. FIG. 5 is a block diagram illustrating the effect of backplane sectorization upon user visibility as may be implemented in some embodiments. In this example, the backplane 505 is a reflective (at least as to the transmissions under consideration), circular surface placed behind the antennas 110a-h. Thus, the line of sight for a given user device is obstructed by the backplane 505 for at least half of the antennas 110a-h. For example, the user device 115d may be able to communicate with antennas 110c, 110d, 110d, and 110f via its line of sight 510, but is generally obstructed by the backplane 505 from antennas 110a, 110b, 110h, and 110g. Accordingly, the channel matrix entries relating user device 115d to antennas 110a, 110b, 110h, and 110g may be substantially close to zero (some minor reflection may occur around the backplane).

The backplane 505 can thereby be used to divide the regions around the system 105 into "sectors". For example, user devices 115d and 115c may share nonzero channel matrix relations with antennas 110c, 110d, 110d, and 110f and would accordingly be associated with the same "sector" 520b. Conversely, user devices 115a and 115b may be associated with the sector 520a. Though presented here as a static object, one will recognize that the backplane may be substituted with time-varying components (e.g., dynamic filters). FIG. 6 is a channel matrix illustrating the effect of backplane sectorization upon the channel matrix as may occur in some embodiments.

One of the benefits of dynamic sectorization is that it allows for the transformation of dense MIMO channel matrices to sparse representations. This has a direct impact on some of the computational aspects of ZF precoding outlined above. For example, zeros will reduce in the number of required multiplication/additions needed to compute the Hermitian matrix $A=CC^H$, i.e. Step 1 (block 310) of the ZF precoding algorithm discussed herein with respect to FIG. 3. Further reductions are realized in the final step of the algorithm which is the calculation of $C^H A^{-1}$, where the sparsity pattern of $C^H$ can again be exploited to avoid unnecessary multiplications/additions. This reduction may be significant from an implementation point of view in light of higher number of antennas as highlighted in FIG. 4.

Sparsity via Individual Antenna Directivity

Figure 7:
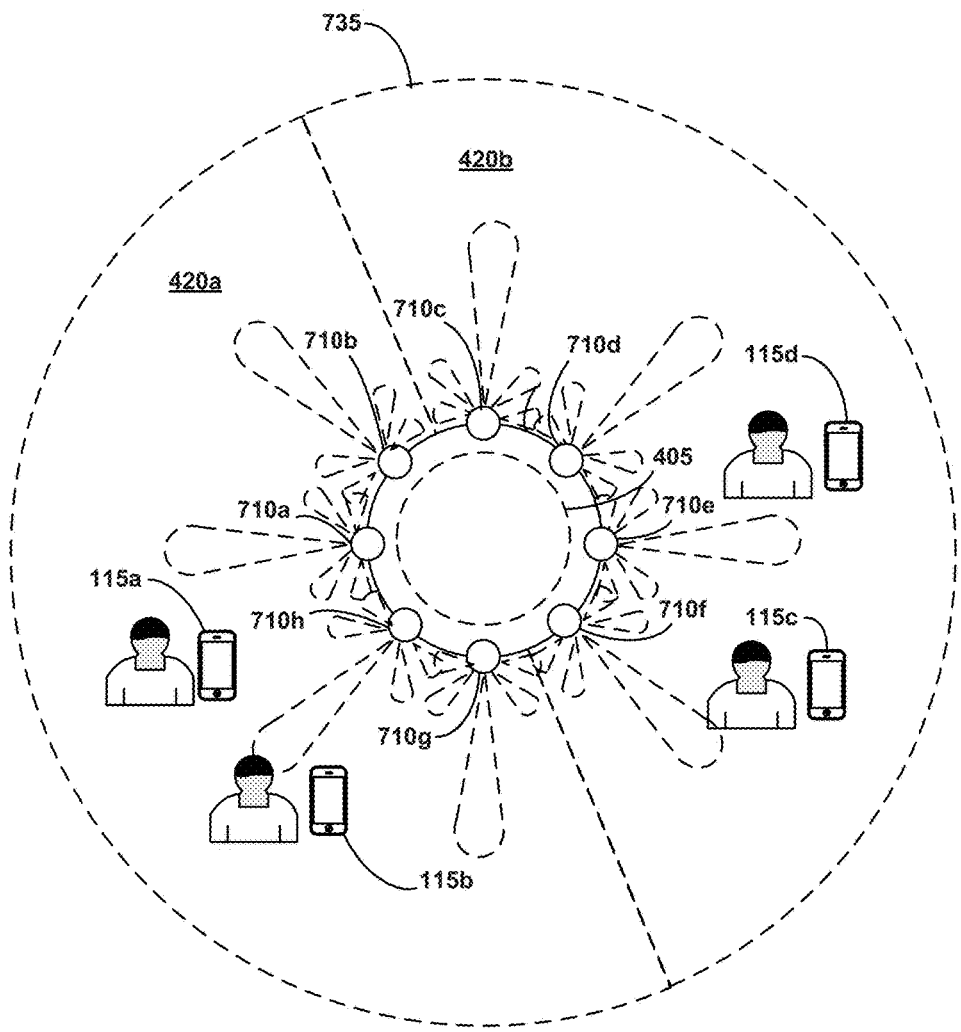
FIG. 7 is a block diagram illustrating the effect of local directivity in conjunction with backplane sectorization upon user visibility as may be implemented in some embodiments.

In addition to, or in lieu of, backplane sectorization, some embodiments also use directional antennas to introduce sparseness into the channel matrix. FIG. 7 a block diagram illustrating the effect of local directivity in conjunction with backplane sectorization upon user visibility as may be implemented in some embodiments. Each of the antennas 710a-h may be directionally biased to provide a stronger power distribution in a given direction. Backplane 505 may still be included to provide general sectorization. The combined effect of the backplane 505 and directionality of antennas 710a-h may be to introduce further zero coefficients in the channel matrix.

As mentioned, sectorization can serve to separate some users. This is the case for users user devices 115d and 115a in the example of FIG. 5. Unfortunately, the extent in which this phenomenon creates zeros in A is limited as it requires many paired-users that are exactly on opposite ends of the antenna array. The configuration in FIG. 5, for example, will not lead to a sparse matrix A. A second mechanism that may help in this regard is the utilization of narrow beamwidth element patterns. The antenna elements of the example in FIG. 5, were implicitly assumed to be isotropic, i.e. widebeam, thus the metal backplane was the only effective means of isolating the patterns between the elements. However, one may consider the use of antenna elements with a higher directivity, e.g. by using multiple antenna elements to form a subarray at each base-station antenna as presented in FIG. 7. The higher directivity will naturally create more narrow beamwidths at each element which in turn leads to lower cross-correlations between the element factors and ultimately smaller entries for A.

Consider an example massive MIMO system with M=96 antennas at the base-station configured as a uniform circular array (UCA), serving K=24 users located randomly around the base-station. The base-station antenna array consists of patch elements where the length of each slot is L=0.5λ and the distance between the slots for each element is W=wλ for some w>0. The variable w is an artificial means of controlling the directivity (gain) of each patch antenna pattern. Higher values of w lead to higher directivity patterns that may also exhibit side-lobes. With the users scattered randomly around the base-station, each user can be allocated a channel to the base-station according to the user's line-of-sight component dictated by the steering vector to the entire antenna array and the individual element patterns.

Figure 8A:
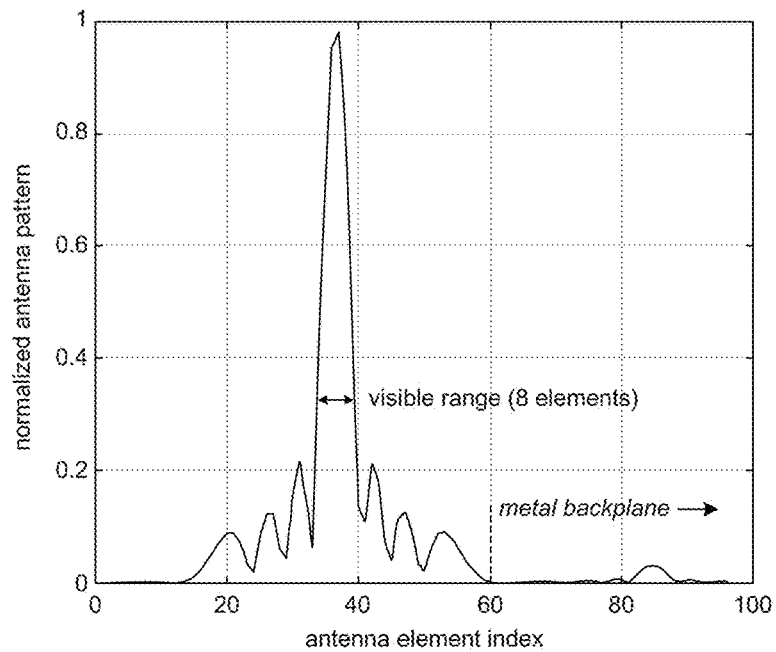
FIGS. 8A-B are a series of plots of the antenna pattern per antenna element index for low and high directivity as simulated to occur in some embodiments.
Figure 8B:
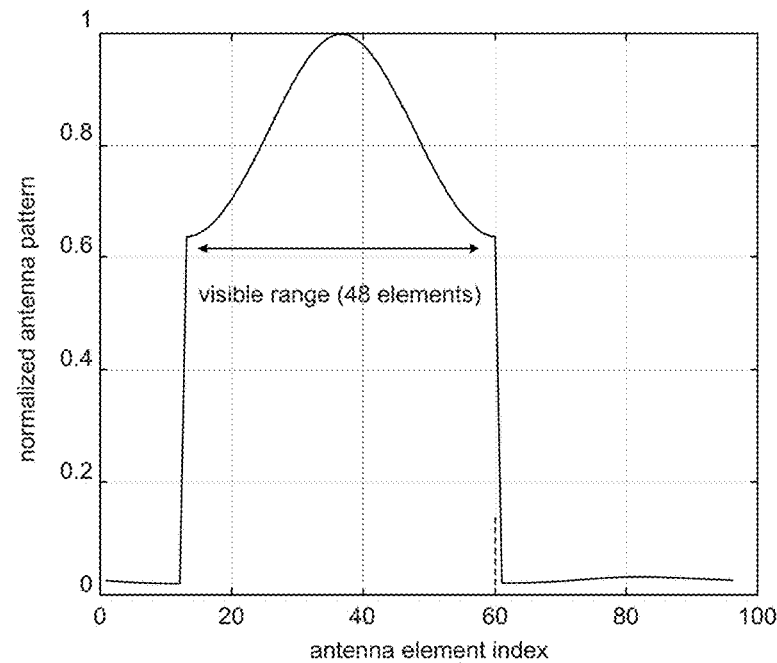

FIGS. 8A-B show the normalized antenna pattern for one such user under two different choices of w. By setting w=0.5 a low directivity use case results for a patch antenna element where the distance between the slots is half the wavelength, thus suppressing side-lobes and creating a broad beam at each antenna element. The antenna pattern for this case is plotted in FIG. 8A and shows that the maximum value is reached for element number 38 which for this user is the antenna element in direct broadside direction. The pattern attenuates on other side of this element until it reaches the metal backplane (element numbers 12 and 60) where it is considerably attenuated thereafter. This plot shows that for w=0.5 the "visible range" for this user (and any other user), is 48=(60−12) elements which constitutes half the base-station antenna array (visible area=96/2), where the visible range is denoted as the main-lobe of the antenna pattern. This configuration is similar to the previous example in FIG. 5.

To decrease the visible range of the user, various embodiments increase the distance between the slots for each patch antenna, thus creating more directive patterns. This high directivity situation is shown in FIG. 8B for w=4. As can be seen from this plot, the visible range for the user, i.e. roughly 10 elements, is considerably smaller than that of the w=0.5 case owing to the more directive pattern emanating from each antenna element in this case. Note that for the latter case, the metal back-plane once again attenuates the pattern considerably beyond the visible range. The presence of side-lobes is also evident in this plot which is typical for w>0.5.

Figure 9:
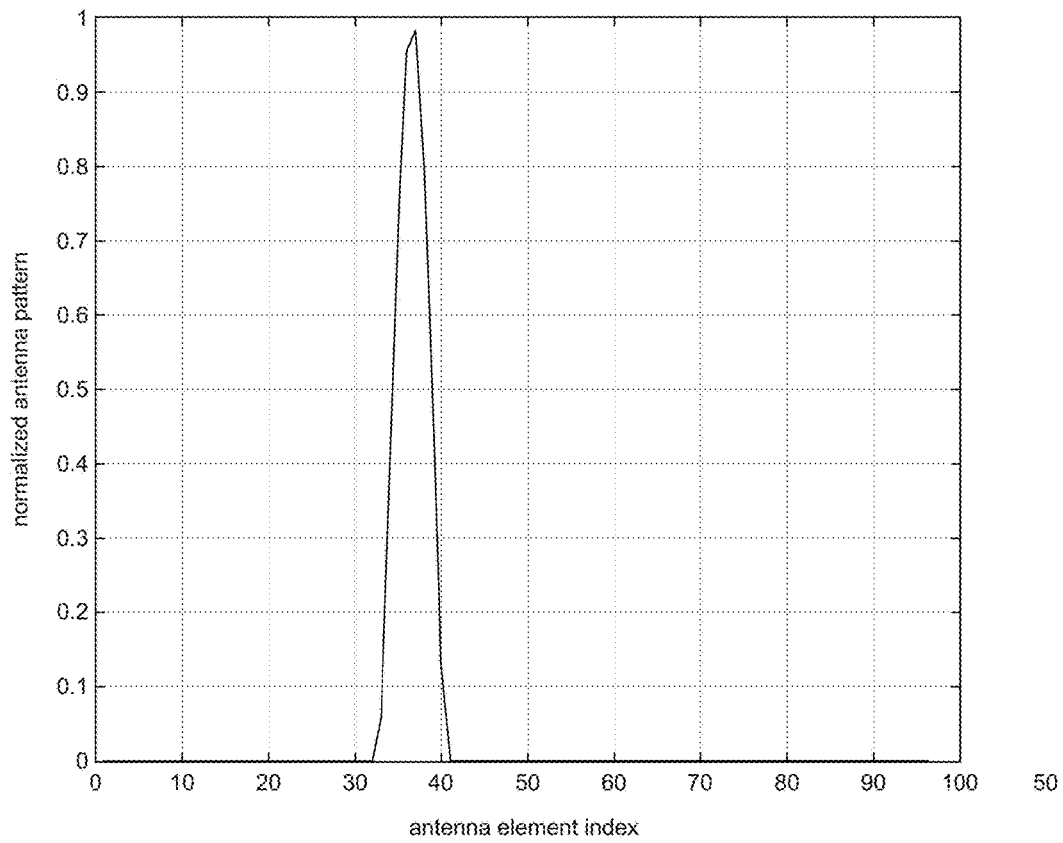
FIG. 9 is a plot approximating the user channel in FIG. 8B by nulling the channel outside the visible range as simulated to occur in some embodiments.

Reducing the visible range by using higher gain antenna elements, along with the metal backplane at the base stations, can lead to significant computational savings in calculating the ZF precoder via sparse representations. To create sparsity some embodiments approximate each users antenna pattern by substituting zeros for all the channels except those within the visible range of the user. The channel for the user in FIG. 8B, for instance, would be approximated by FIG. 9. FIG. 9 is a plot approximating the user channel in FIG. 8B by nulling the channel outside the visible range as simulated to occur in some embodiments. Note the plot in FIG. 9 effectively represents one row of the channel matrix C.

Figure 10A:
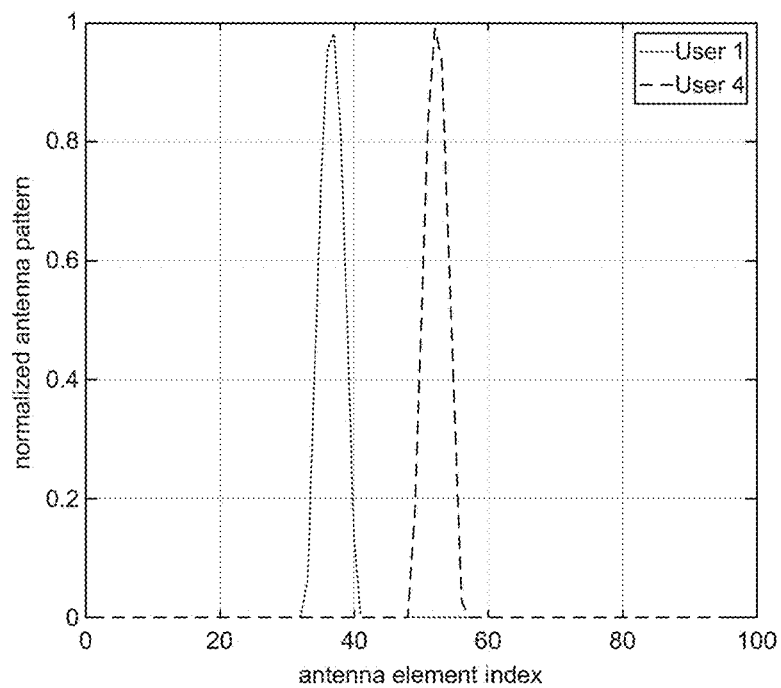
FIG. 10A is a plot of channel behavior with overlapping elements.
Figure 10B:
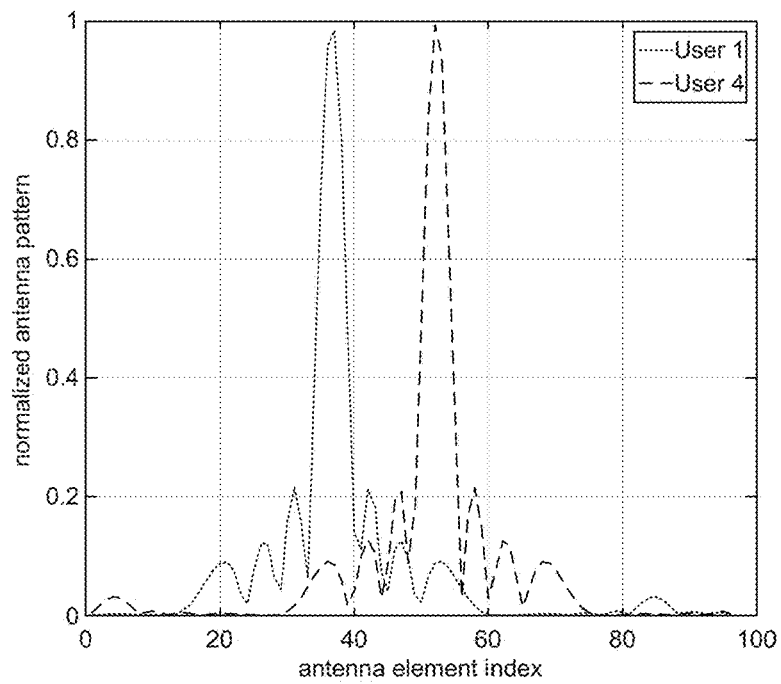
FIG. 10B is a plot of channel behavior with orthogonal elements.

For the example of FIG. 8B, the MIMO channel matrix C has a dimension of 2496, and correspondingly $A=CC^H$ is an 24×24 matrix where each row of C has a pattern similar to that of FIG. 9, albeit with the main-lobe being located at a different location corresponding to the users relative position to the base-station UCA. The more narrow visible range afforded by the use of higher directivity antenna elements increases the likelihood of finding users with orthogonal channels. This is illustrated in FIGS. 10A-B which show the original channels for users 1 and 4 along with the approximated, i.e. truncated, channels. The approximated channels are orthogonal while the original channels have overlapping elements. In other words, the corresponding cross-correlation element $a_{14}=a_{41}$ in A are zero for the approximated channel and non-zero for the original configuration.

Figure 11A:
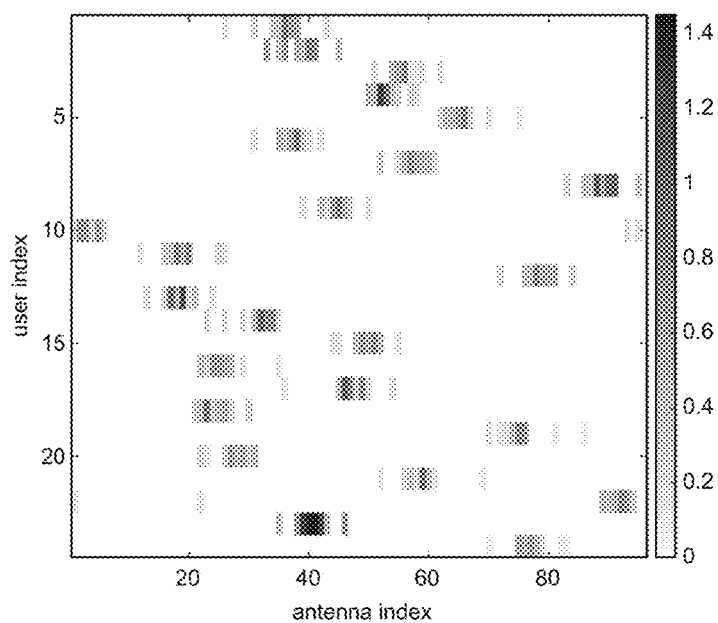
FIG. 11A is a plot of 24×96 MIMO channel matrix C approximating the user channel in FIG. 8A.
Figure 11B:
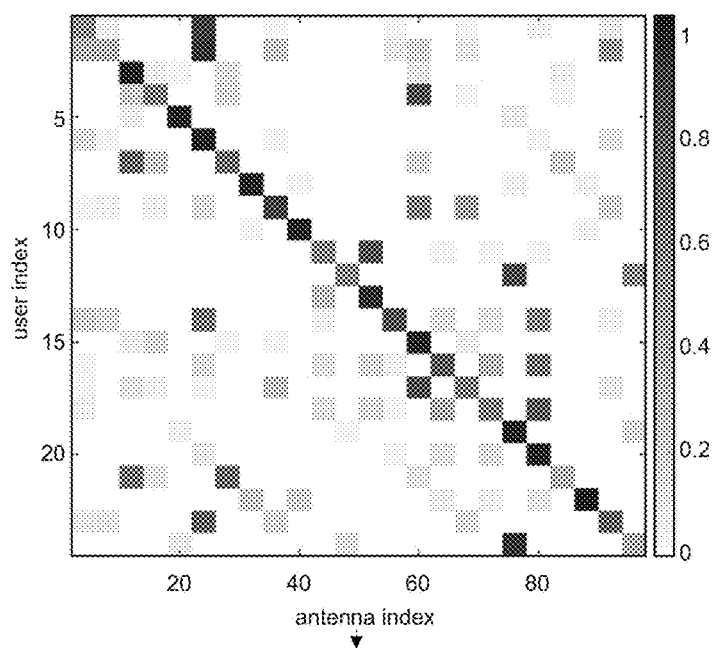
FIG. 11B is a plot of 24×96 MIMO channel matrix C approximating the user channel in FIG. 8A by nulling the channel.

Extending this observation across all the users, the matrix A is exhibited to exhibit a larger number of zero elements, i.e. more sparsity, when the channels are truncated in the fashion described above compared to the original formation. To visualize these results, FIGS. 11A-B maps of the MIMO channel matrix C and cross-correlation matrix A in for the example antenna situation of FIG. 8A, i.e., for the first case of w=0.5. FIG. 11A is a plot of 24×96 MIMO channel matrix C approximating the user channel in FIG. 8A. FIG. 11B is a plot of 24×96 MIMO channel matrix C approximating the user channel in FIG. 8A by nulling the channel. The visible-ranges for each user are evident in FIG. 11A as dark strips in the rows of the matrix visualization. To measure sparsity one calculates the number of non-zero (nnz) elements of the matrices. For FIGS. 11A-B nnz(C)=1152, nnz(A)=0 which proves that although C is relatively sparse, this sparsity is not carried through to A for the case of broad width element patterns.

Figure 12A:
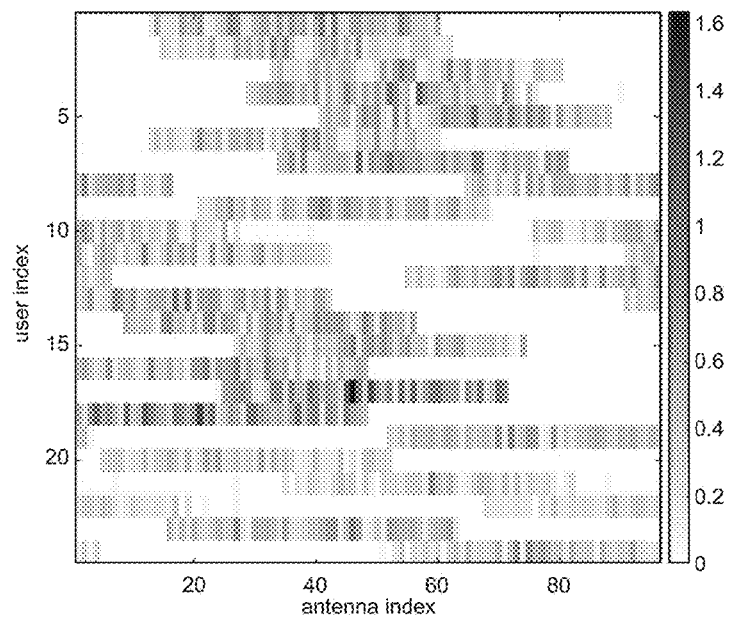
FIG. 12A is a plot of a 24×24 MIMO channel matrix C approximating the user channel in FIG. 8B.
Figure 12B:
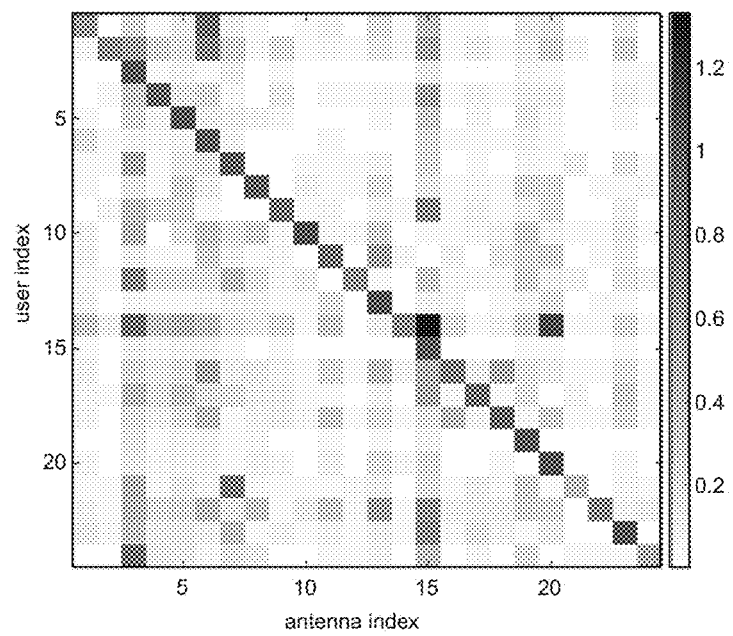
FIG. 12B is a plot of 24×24 MIMO channel matrix C approximating the user channel in FIG. 8B by nulling the channel.

Similarly, the matrix visualization corresponding to the high directivity case (w=4) is shown in FIGS. 12A-B (corresponding to FIG. 8B). FIG. 12A is a plot of a 24×24 MIMO channel matrix C approximating the user channel in FIG. 8B. FIG. 12B is a plot of 24×24 MIMO channel matrix C approximating the user channel in FIG. 8B by nulling the channel.

Comparing FIG. 11A with FIG. 12A one will see how the higher gain elements lead to narrower visible range manifested in the channel matrix where the number of non-zero elements as decreased by 85.7%. As discussed herein, this will lead to considerable computational savings in the matrix multiplication steps in calculating the ZF precoder. By comparing FIG. 11B with FIG. 12B one will see that the cross-correlation matrix now exhibits zero elements. This will lead to computational savings in calculating the matrix inverse. FIG. 10A is a plot of channel behavior with overlapping elements and FIG. 10B is a plot of channel behavior with orthogonal elements. As indicated, truncating the channels to include only the main lobe can lead to orthogonal channels.

Dynamic Sectorization and Low Complexity Sparse Matrix Inversion

The computational savings in computing the inverse of the MIMO cross-correlation matrix $A=CC^H$ can be realized using sparse Cholesky factorization. In this method, a reordering of the rows (and or columns) of A is computed so as to reduce both the number of fill elements in Cholesky factor and the number of arithmetic operations (FLOPs) in the numerical factorization. Specifically, various embodiments consider the Cholesky factorization of A with symmetric pivoting, that is, $PAP^T=LL^H$, where P is a permutation matrix and L is a lower triangular matrix called the Cholesky factor. Nonzero elements of L at positions that are structural zeros in $PAP^T$ are called fill elements and determining a permutation matrix P, such that the number of these fill elements is minimum is the first step in computing the sparse Cholesky decomposition. To achieve computational savings, it is important to find a suitable matrix P since the arithmetic work in terms of FLOPs for computing L is solely determined by the permutation matrix.

Unfortunately, graph theory has shown that solving for the optimal P is NP hard, so instead various embodiments resort to heuristic methods. One such method is known as the Minimum Degree Algorithm. The Minimum Degree Ordering Algorithm is one of the most widely used heuristics, since it produces factors with relatively low fill-in on a wide range of matrices. Because of this, the algorithm has received much attention over the past three decades.

Figure 13A:
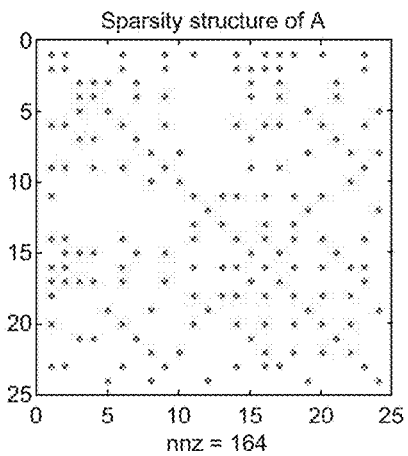
FIGS. 13A-D are a series of tables illustrating sparsity patterns using a Minimum Degree Algorithm and corresponding number of non-zero (nnz) elements as may occur in some embodiments.
Figure 13B:
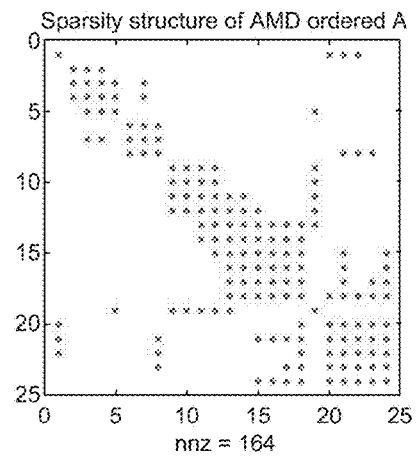
Figure 13C:
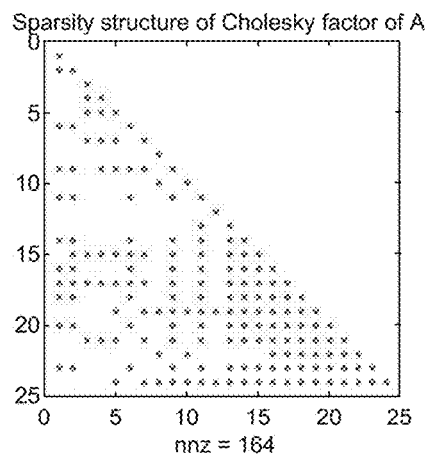
Figure 13D:
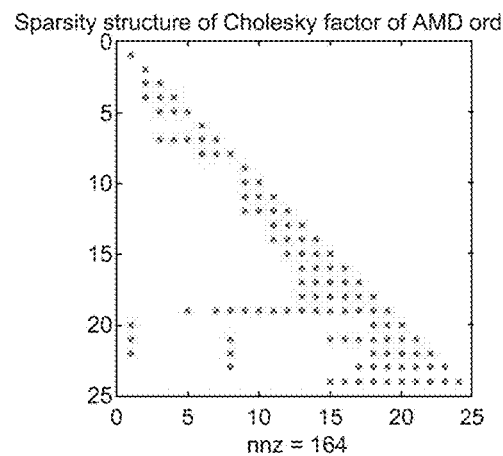

To illustrate the effects of the Minimum Degree Algorithm for various of the considered embodiments, results for an approximate Minimum Degree Algorithm implemented in MATLAB via the function amd( ) on the configuration of the example of FIG. 8B for the high directivity ($w=4\lambda$). FIGS. 13A-D plots a visualization of the sparsity patterns for the original matrix A (FIG. 13A), Cholesky factor of A (FIG. 13C), reordered matrix $PAP^T$ (FIG. 13B), and Cholesky factor of the reordered matrix (FIG. 13D). Comparing the figures, one will see the benefit of the Minimum Degree Algorithm where the number of non-zero (nnz) elements has reduced by 37.8%. This saving translates to savings in FLOPs when computing the Cholesky decomposition of A. It is difficult to quantify the FLOP savings mathematically, so instead various embodiments rely on simulation runtime to compare the performance of the two configurations considered above: 1) low directivity elements ($w=0.5\lambda$) using regular Cholesky factorization 2) high directivity ($w=4\lambda$) using sparse Cholesky factorization. Simulations show that the sparse Cholesky factorization via the approximate Minimum Degree Algorithm executes on average 44.5% faster compared to the dense counterpart.

Finally, note that while the sparse Cholesky decomposition allows for a faster computation of the ZF precoder, it may lead to some end-to-end performance degradation owing to the approximation, i.e. truncation, performed on the channel (or channel estimate) prior to the precoder calculation. To quantify this, Monte-Carlo simulations on the configuration of FIGS. 8A-B were performed using a system-level simulator. The table of FIG. 14 shows the results for the downlink, defining the baseline as a system that does not utilize dynamic sectorization, i.e. the channel matrix C is dense, as a reference for comparison. Notice from the table of FIG. 14 that for the baseline solution the number of non-zero elements of C is equal to the number of elements of C, i.e. 24×96=2304. As discussed above, using higher gain antenna elements can lead to more zero elements in the channel matrix. As is evident in the second row of the table of FIG. 14, with high enough directivity one may also achieve sparse channel correlation matrices. Sparsity in the correlation matrix can lead to substantial reduction in the computational complexity of calculating the ZF precoder as is evident in the third row of data in the table of FIG. 14. Finally, the approximation used in the sparse Cholesky decomposition, while reducing the computational complexity, can lead to performance degradation as is evident in the last row in the table of FIG. 14. In summary, for this simulation setup, one may conclude that using high directivity elements can lead to almost 50% savings in computation while degrading the performance of the system by 10%.

Example Processing Algorithm

Figure 15:
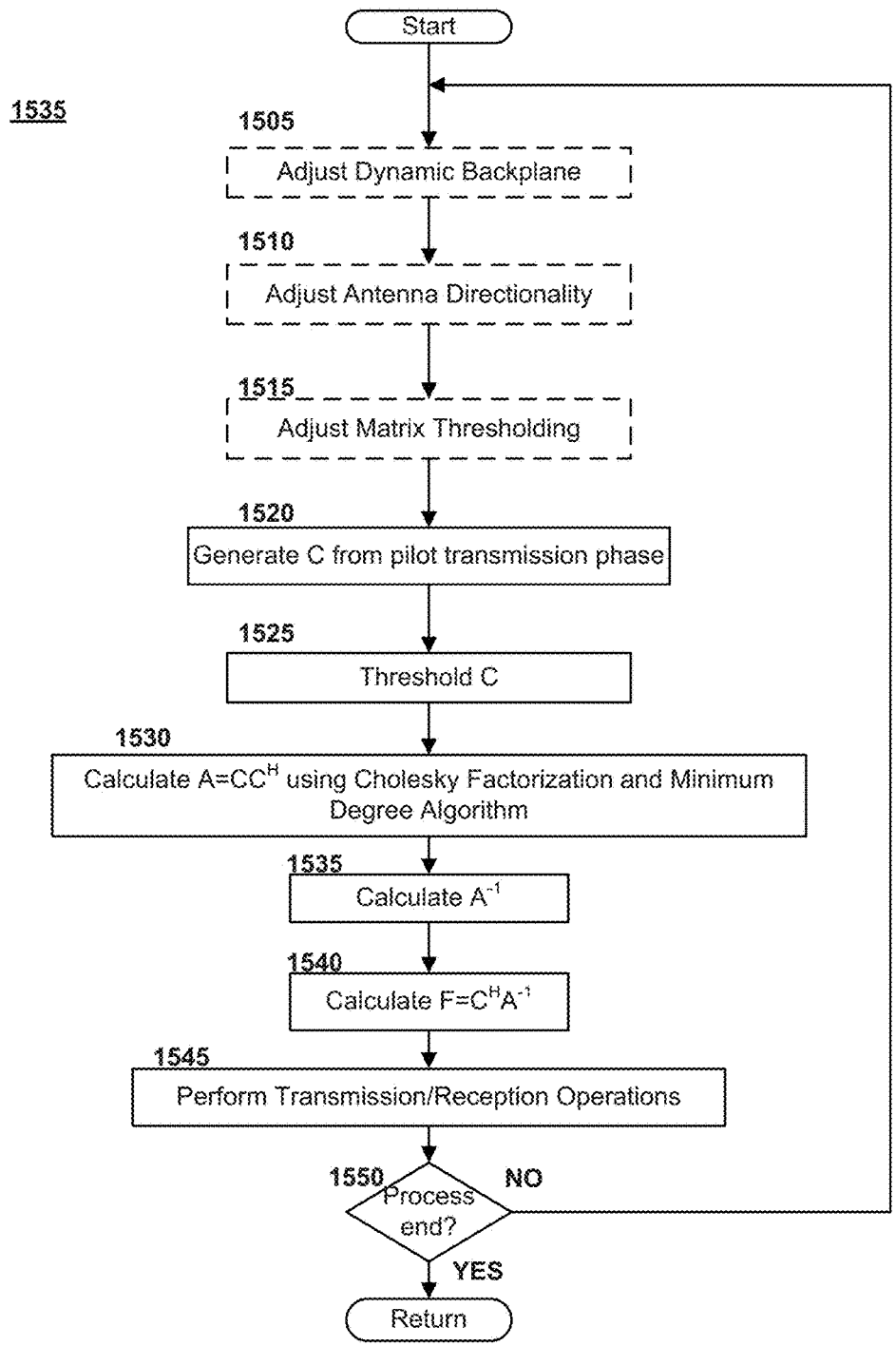
FIG. 15 is a flow diagram illustrating MIMO zero-forcing calculations including various modifications contemplated in some embodiments.
Figure 16A:
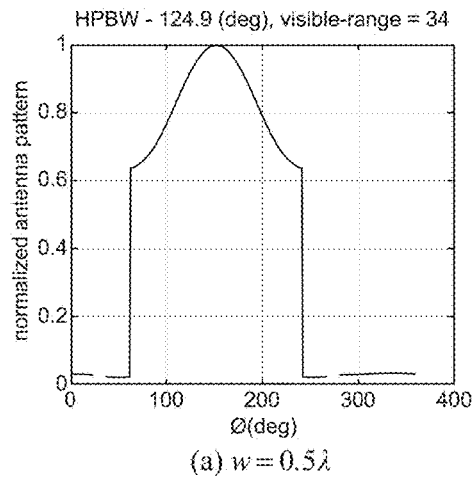
FIGS. 16A-D are plots of the original channels with various factors as simulated to occur in some embodiments.
Figure 16B:
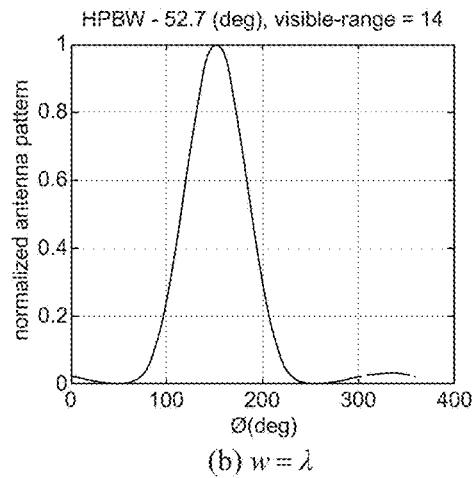
Figure 16C:
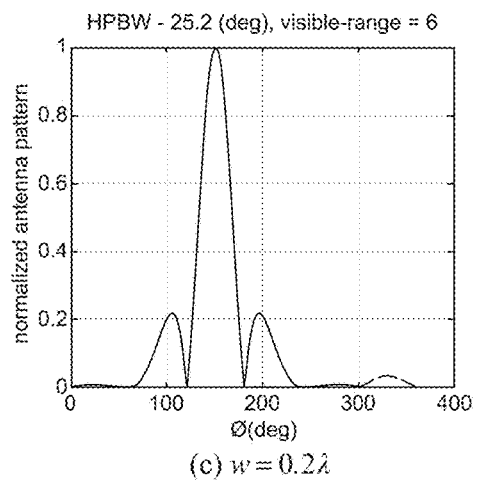
Figure 16D:
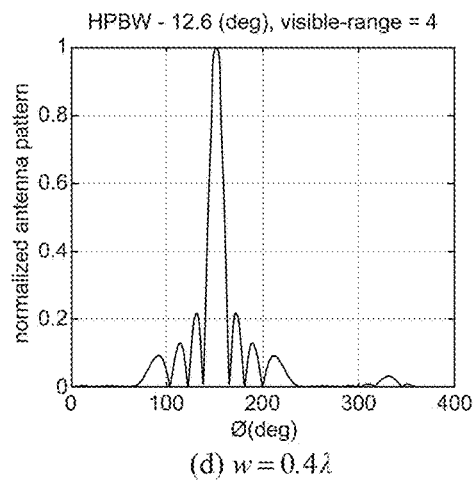

FIG. 15 is a flow diagram illustrating MIMO zero-forcing calculations including various modifications contemplated in some embodiments. Optimizations may be performed at blocks 1505, 1510, and 1515, such as backplane adjustment, antenna directivity modification, and channel matrix thresholding adjustment. These updates may be determined based upon past behavior (e.g., results from past iterations in conjunction with a Bayesian prediction). At block 1520, the system may generate the current channel matrix from the pilot signals. At block 1525, the system may threshold the channel matrix based upon the thresholds determined at block 1515. At block 1530, the system may use Cholesky factorization and the Minimum Degree Algorithm to calculate A. At block 1535, the inverse of A may be calculated and the precoding matrix at block 1540. Transmission/reception may then be performed with the user devices. The process may iterate at block 1550 as desired.

Miscellaneous Simulation Results

FIG. 16A-D are plots of the original channels with various factors as simulated to occur in some embodiments.

Computer System

Figure 17:
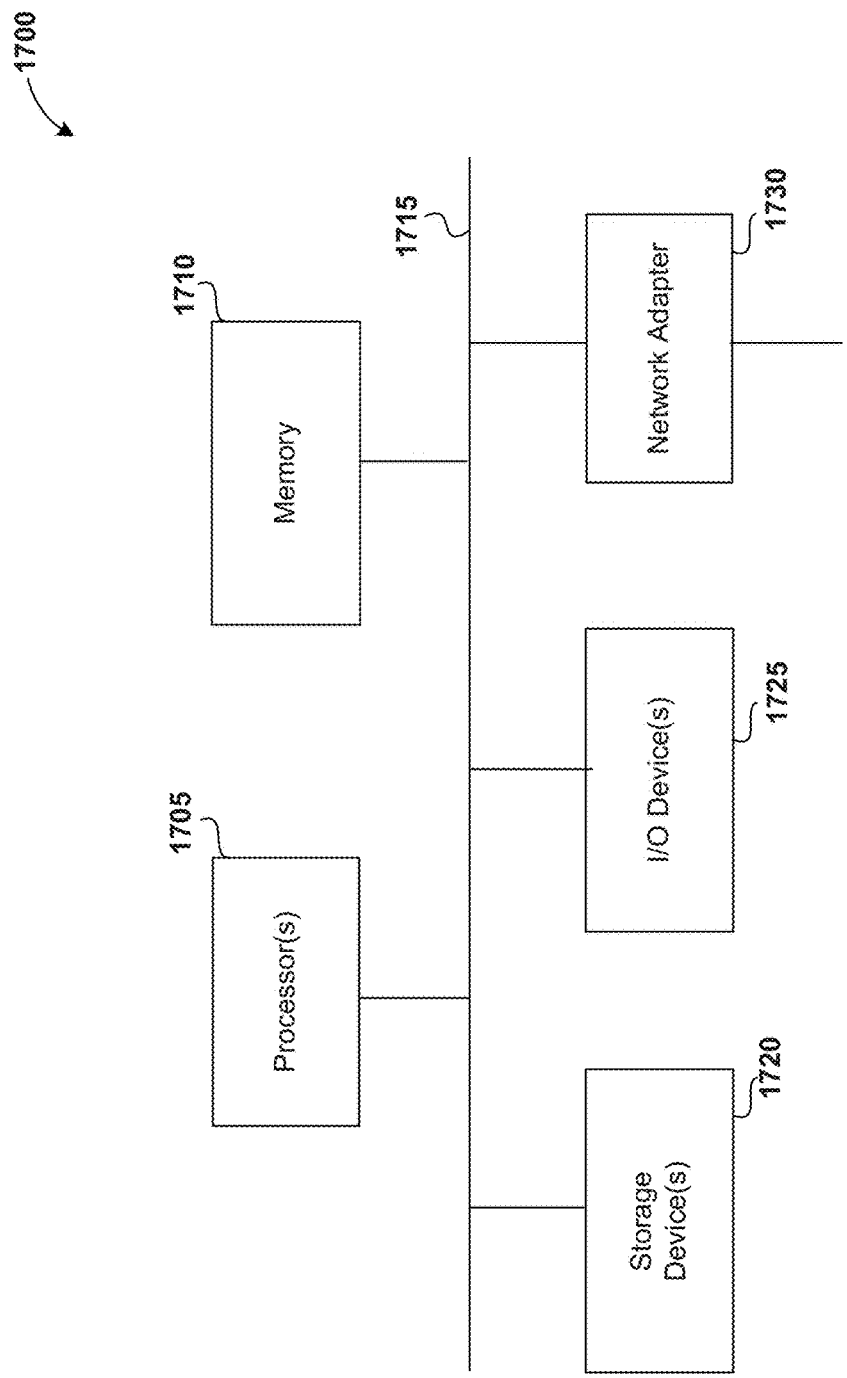
FIG. 17 is a block diagram of a computer system as may be used to implement features of some of the embodiments.

FIG. 17 is a block diagram of a computer system as may be used to implement features of some of the embodiments. The computing system 1700 may include one or more central processing units ("processors") 1705, memory 1710, input/output devices 1725 (e.g., keyboard and pointing devices, display devices), storage devices 1720 (e.g., disk drives), and network adapters 1730 (e.g., network interfaces) that are connected to an interconnect 1715. The interconnect 1715 is illustrated as an abstraction that represents any one or more separate physical buses, point to point connections, or both connected by appropriate bridges, adapters, or controllers. The interconnect 1715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1710 and storage devices 1720 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1710 can be implemented as software and/or firmware to program the processor(s) 1705 to carry out actions described above. In some embodiments, such software or firmware may be initially provided to the processing system 1700 by downloading it from a remote system through the computing system 1700 (e.g., via network adapter 1730).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A communications system, comprising:
  a plurality of antennas, wherein the plurality of antennas comprises patch elements, and wherein each of the patch elements has a length of approximately half the transmission wavelength;
  a backplane configured to physically separate a first group of the plurality of antennas and a second group of the plurality of antennas;
  at least one processor;
  at least one memory comprising instructions configured to cause the at least one processor to:
    transmit a pilot signal from an antenna of the plurality of antennas;
    receive feedback from a user device based upon the pilot signal;
    generate a channel matrix based upon the feedback;
    assign zero values to entries in the channel matrix below a threshold;
    determine a precoder matrix based upon the channel matrix; and
    adjust a directional pattern of a third group of the plurality of antennas based upon the precoder matrix.

2. The communications system of claim 1, wherein the backplane is configured to be dynamically adjusted.

3. The communications system of claim 1, wherein the antennas are directional.

4. The communications system of claim 1, wherein determining the precoder matrix comprises using Cholesky Factorization and the Minimum Degree Algorithm after assigning the zero values.

5. The communications system of claim 1, further comprising adjusting the backplane upon determination of the precoder matrix.

6. The communications system of claim 1, wherein the plurality of antennas comprises more than 90 antennas.

7. A computer-implemented method, comprising:
  transmitting a pilot signal from an antenna of a plurality of antennas, the first group of the plurality of antennas separated with a backplane from a second group of the plurality of antennas;
  receiving feedback from a user device based upon the pilot signal;
  generating a channel matrix based upon the feedback;
  assigning zero values to entries in the channel matrix below a threshold;
  computing a precoder matrix based upon the channel matrix;
  adjusting the backplane upon determination of the precoder matrix; and
  adjusting a directional pattern of a third group of the plurality of antennas based upon the computed precoder matrix.

8. The computer-implemented method of claim 7, wherein determining the precoder matrix comprises using Cholesky Factorization and a Minimum Degree Algorithm after assigning the zero values.

9. The computer-implemented method of claim 7, wherein the plurality of antennas comprises patch elements.

10. The computer-implemented method of claim 9, wherein each of the patch elements has a length of approximately half the transmission wavelength.

11. The computer-implemented method of claim 7, wherein the plurality of antennas comprises more than 90 antennas.

12. A non-transitory computer-readable medium, comprising instructions configured to cause a communication system to:
  transmit a pilot signal from an antenna of a plurality of antennas, the plurality of antennas comprising first group and a second group of antennas, the first group of the plurality of antennas separated with a backplane from the second group of the plurality of antennas;
  receive feedback from a user device based on the pilot signal;
  generate a channel matrix based upon the feedback;
  assign zero values to entries in the channel matrix below a threshold;

determine a precoder matrix based upon the channel matrix, wherein determining the precoder matrix comprises using Cholesky Factorization and a Minimum Degree Algorithm upon assigning the zero values; and adjust a directional pattern of a third group of the plurality of antennas based upon the precoder matrix.

13. The non-transitory computer-readable medium of claim 12, further comprising adjusting the backplane upon determination of the precoder matrix.

14. The non-transitory computer-readable medium of claim 12, wherein the plurality of antennas comprise comprises patch elements.

15. The non-transitory computer-readable medium of claim 14, wherein each of the patch elements has a length of approximately half the transmission wavelength.

16. The non-transitory computer-readable medium of claim 12, wherein the plurality of antennas comprises more than 90 antennas.

* * * * *